United States Patent [19]

Eida et al.

[11] Patent Number: 4,867,789

[45] Date of Patent: Sep. 19, 1989

[54] FLOCCULANT PURIFICATION OF INK

[75] Inventors: Tsuyoshi Eida, Yokohama; Makoto Shioya, Tokyo; Masatsune Kobayashi, Yokohama, all of Japan

[73] Assignee: Canon Kabushiki Kaisha, Tokyo, Japan

[21] Appl. No.: 106,902

[22] Filed: Oct. 9, 1987

Related U.S. Application Data

[63] Continuation of Ser. No. 794,149, Nov. 1, 1985, abandoned.

[30] Foreign Application Priority Data

Nov. 8, 1984 [JP] Japan ............................... 59-234209
Nov. 8, 1984 [JP] Japan ............................... 59-234210

[51] Int. Cl.$^4$ ...................... C09B 67/54; C09D 11/00; C09D 11/02; C09D 11/16
[52] U.S. Cl. ........................................ 106/22; 106/23; 534/793; 534/836; 534/872; 534/887; 540/140
[58] Field of Search .................. 534/887; 106/22, 23, 106/308 Q

[56] References Cited

U.S. PATENT DOCUMENTS

| 2,350,523 | 6/1944 | O'Neal | 534/887 X |
| 2,354,588 | 7/1944 | Gainey | 534/887 X |
| 2,816,114 | 12/1957 | Ehrich et al. | 534/887 X |
| 2,836,588 | 5/1958 | Fearon | 534/887 X |
| 4,340,389 | 7/1982 | Nonn et al. | 539/887 X |
| 4,541,831 | 9/1985 | Gunther et al. | 534/887 X |

FOREIGN PATENT DOCUMENTS

| 0027637 | 4/1981 | European Pat. Off. | 534/887 |
| 51-31726 | 3/1976 | Japan | 534/887 |
| 1156836 | 7/1944 | United Kingdom | 534/887 |

*Primary Examiner*—Floyd D. Higel
*Attorney, Agent, or Firm*—Fitzpatrick, Cella, Harper & Scinto

[57] ABSTRACT

A method for purifying a dye solution is provided. The method comprises the steps of dissolving an impure dye in a solvent. A flocculant is then added to the dye solution in order to flocculate the imprity so that the impurity may then be removed from the solution. A method for producing on ink utilizing the purification procedure is also provided.

25 Claims, No Drawings

4,867,789

FLOCCULANT PURIFICATION OF INK

This application is a continuation of application Ser. No. 794,149 filed Nov. 1, 1985, now abandoned.

BACKGROUND OF THE INVENTION

1. Field of the Invention

The present invention relates to a method for purifying aqueous dye solutions. More particularly, the present invention provides a high purity water-soluble dye for use as a coloring component of a recording agent. The recording agent can be used, for example, in an ink-jet recording system or a manual writing implement (hereinafter, the recording liquid is referred to as "ink").

2. Description of the Prior Art

Water-soluble dyes such as direct cotton dyes, acid dyes, basic dyes, reactive dyestuffs and the like have conventionally been used for the dyeing of fibers, woven cloths, etc. Further, these dyes are recently used as coloring components in ink jet recording wherein an ink is discharged by various discharging means to form ink droplets and the ink droplets are deposited to a recording medium such as a paper or the like in accordance with image signals. Furthermore, the water-soluble dyes are used as coloring components of inks used in writing, such as fountain pen, felt tip pen, ball point pen and the like.

As coloring component dyes of inks, particularly inks which are used in ink jet recording, there are generally utilized dyes for dyeing of fibers. These dyes contain large amounts of additives or impurities. Therefore, when such commercially available dyes are used for ink jet recording, the inks cause various troubles. One of the most serious is clogging of the ink-discharging orifice, and another is deposition of impurities on the heat-generating head in the ink jet recording method utilizing heat energy for ink discharge. In order to prevent such troubles, purification of dyes used in these inks have heretofore been proposed and carried out. Accordingly, some improvements have been achieved and problems caused by inks have been reduced by using dyes of higher purity. However, there still exists a phenomenon that inks which are pure after production, when delivered from ink manufacturers and stored for several months or years, frequently cause unanticipated problems. These troubles are significant particularly in the ink jet recording method employing heat energy for ink discharge.

SUMMARY OF THE INVENTION

The main object of the present invention is to provide a dye capable of giving an ink which remedies the above mentioned shortcomings. This ink, even at a high dye concentration does not the orifice, etc. of ink jet recording equipment during use and also during long term storage, forms no deposit on the heat-generating head of ink jet recording equipment utilizing heat energy, and has excellent stability.

According to one aspect of the present invention, there is provided a method for purifying a dye solution, comprising dissolving a dye in a solvent to prepare a dye solution, and treating the dye solution by addition of a flocculant.

According to another aspect of the present invention, there is provided a method for purifying a dye solution, comprising the steps of dissolving a dye in a solvent to prepare a dye solution, treating the dye solution by addition of a flocculant, and removing insoluble matters from the dye solution by filtration or centrifugation.

According to further aspects of the present invention, there is provided a method for producing an ink by utilizing the above method for dye purification.

DETAILED DESCRIPTION OF THE PREFERRED EMBODIMENT

In order to attain the above objects the present inventor undertook extensive research. Commercially available dyes contain various impurities (e.g. various inorganic and organic substances such as dispersing agents and leveling agents) and the above mentioned problems are caused mainly by these impurities. Hence, the adverse effects of the impurities were investigated. It was found that the greatest cause for clogging of nozzles and orifices, for formation of precipitates during ink storage and for deposition of impurities on heat-generating heads in the ink jet recording method utilizing heat energy is the presence in ink of Fe, Si, P, polyvalent metal ions, and colloidal substances consisting of these compounds and that these harmful substances can be efficiently removed from dyes used in inks by using a particular method. Thus the present invention has been completed.

The main characteristic of the present invention lies in the use of a flocculant for purification of a water soluble dyes. The dyes to which the present invention is applicable are water-soluble dyes conventionally used mainly for the dyeing of various fibers, such as direct cotton dyes, acid dyes, basic dyes, reactive dyestuffs and the like. As dyes which are preferably used in inks for ink jet recording and satisfy such requirements as distinctness, water solubility, stability, light resistance and the like, there are mentioned, for example, C. I. Direct Black 17, 19, 32, 51, 71, 108 and 146; C. I. Direct Blue 6, 22, 25, 71, 86, 90, 106 and 199; C. I. Direct Red 1, 4, 17, 28 and 83; C. I. Direct Yellow 12, 24, 26 and 98; C. I. Direct Orange 34, 39, 44, 46 and 60; C. I. Direct Violet 47 and 48; C. I. Direct Brown 109; C. I. Direct Green 59; C. I. Acid Black 2, 7, 24, 26, 31, 52, 63, 112 and 118; C. I. Acid Blue 9, 22, 40, 59, 93, 102, 104, 113, 117, 120, 31, 52, 63, 112 and 118; C. I. Acid Blue 9, 22, 40, 59, 93, 102, 104, 113, 117, 120, 167, 229 and 234; C. I. Acid Red 1, 6, 32, 35, 37, 51, 52, 80, 85, 87, 92, 4, 115, 180, 256, 317 and 315; C. I. Acid Yellow 11, 17, 23, 25, 29, 42, 61 and 71; C. I. Acid Orange 7 and 19; C. I. Acid Violet 49; C. I. Basic Black 2; C. I. Basic Blue 1, 3, 5, 7, 9, 24, 25, 26, 28 and 29; C. I. Basic Red 1, 2, 9, 12, 13, 14 and 37; C. I. Basic Violet 7, 14 and 27; C. I. Food Black 2; etc. These dyes are preferably used in the present invention. However, the present invention is not restricted to such dyes.

The water-soluble dyes mentioned above generally are available in the market. The commercially available products contain large amounts of sodium chloride, sodium sulfate and other inorganic salts and further contain inorganic substances such as alkaline earth metal salts, various metal compounds and the like as well as many organic substances such as various surfactants, dispersing agents, leveling agents and the like.

Since the above mentioned additives contained in the conventional water-soluble dyes are also water-soluble, purification of these dyes is not simple. When such dyes are thoroughly purified by employing a conventionally known purification method such as filtration, salting-out, ion exchange or the like and are then immediately used as inks for ink jet recording, such inks show excellent performance, as intended. When stored for several months or longer after their preparation, however, these inks cause troubles as, mentioned previously. These troubles caused by stored inks occur, in many cases, after the inks have been distributed to the market and hence it is a serious problem. In order to solve this serious problem, the present inventors undertook extensive research. As the result, it was found that (1) the troubles caused by an ink deteriorated by storage over a long period of time cannot be alleviated by treating the ink by ordinary filtration, ion exchange, etc., (2) the main cause of the troubles comes from a colloidal substance which is present in ink with a relatively high stability but the substances lose their stability when the ink encounter environmental changes such as temperature change, concentration change at a discharging nozzle, thermal shock at a heating head and the like, and (3) said troubles can be completely removed by adding a flocculant to a dye solution to be purified, prior to or during ink preparation to flocculate colloidal substances present in the dye solution and, if necessary, separating the resulting flocculates of any size by means of centrifugation or the like to remove the colloidal substances completely.

The flocculant used in the present invention can be any of ions of bi- or higher-valent metals (e.g. iron, manganese, aluminum, magnesium), ions of metal compounds, ions of oxides of metals (semimetals such as silicon and phosphorus and the like are included), their hydrates and substances which will neutralize electric charges of colloidal substances present in dye solutions, as long as the above ions, hydrates and substances are stable in water. There are preferably used, for example, conventionally known flocculants such as inorganic flocculants (e.g. aluminum hydroxide, aluminum sulfate, ferrous sulfate, ferrous chloride, ferric sulfate, ferric hydroxide, calcium sulfate, calcium carbonate, calcium hydroxide, $Fe_2(SO_4)_3 \cdot FeCl_3$ and organic flocculants (e.g. starch, gelatin, sodium alginate, a polyacrylamide, chitosan). Particularly preferably used in the present invention are flocculants of iron type and aluminum type.

In the present invention method, mainly colloidal substances are changed, by the use of a flocculant, to flocculates which can mostly be removed by filtration. However, in a treatment with a flocculant alone, not all the colloidal substances changes to flocculates removable by filtration; fine and insufficiently grown flocculates of colloidal substances pass through a filter membrane or cause clogging of the membrane when an ordinary filtration is conducted; consequently, the filter membrane need be replaced frequently. The present inventors made a research to solve such problems and found that when a centrifugation is conducted subsequently to the treatment with a flocculant, the fine flocculates of colloidal substances which pass through a filter membrane or cause clogging of the membrane are captured by larger flocculates and separated together with the larger flocculates, whereby an aqueous dye solution substantially free from colloidal substances can be obtained. Such a purified aqueous dye solution cannot be obtained only by treatment with a flocculant or only by the treatment using a centrifuge alone but can be obtained only when these two treatments are conducted in succession in this order.

In the centrifugation treatment, there can be effectively used any commercially available centrifuges.

In the method for dye purification according to the present invention, a dye to be purified is dissolved in water or in a mixed solvent of water and a water-soluble organic solvent in an amount of 0.1 to 10% by weight, preferably 1 to 5% by weight; to the resulting aqueous dye solution is added 0.01 to 1 part by weight, based on 100 parts by weight of the dye, of a flocculant; and the resulting mixture is thoroughly stirred. Such a treatment will eliminate the electric charges from a majority of stable colloidal substances and the like as mentioned above and accordingly the substances lose the colloidal properties to flocculate. The above aqueous dye solution treated with a flocculant is subjected to a filtration treatment. In cases when the previously mentioned troubles arise even after the filtration treatment, there may be successively conducted a centrifugation treatment. In the centrifugation, neither heating nor cooling is required. A centrifugation of 5,000 to 20,000 rpm for about 10 to 60 min can satisfactorily achieve the object of the present invention. Thus an aqueous dye solution from which mainly colloidal substances have been removed can be obtained. The present invention method can be conducted batchwise or continuously.

The purified aqueous dye solution obtained as above, when the dye had been subjected, prior to the above purification method of the present invention, to other purification method to remove other impurities, can be used as it is as an ink for ink jet recording or as an ink for writing pens. When the dye had not been subjected to the other purification method, the purified aqueous dye solution obtained above contain, in many cases, impurities which cannot be removed by a flocculant, such as sodium chloride, sodium sulfate, other metal salts and organic substances; therefore, it is preferable that the purified aqueous dye solution be further purified, as necessary, by a method such as salting-out, fractional precipitation with a water-soluble organic solvent, ultrafiltration, reverse osmosis, ion exchange, exposure to air, lime softening, electrolysis or the like.

The purified aqueous dye solution thus obtained can be made into an ink as it is or after adding thereto necessary additives such as a water-soluble organic solvent and the like, or can be made into a powder by removing the water present in the solution. The amount of impurities remaining in the purified aqueous dye solution or in the purified powder can easily be determined by the use of atomic absorption spectrometry, inductively coupled plasma emission spectral analysis or the like. It is preferable that the concentration of impurities in the purified dye of the present invention be about 200 ppm or below (each of iron, magnesium and phosphorus), 250 ppm or below (silicon), about 1,000 ppm or below (total colloidal substances including these metal compounds) and about 2% by weight or below (total inorganic substances), all based on powdery dye. A purified dye containing impurities so as not to exceed the above limits can provide an ink useful for use particularly in the ink jet recording method using a heat energy. Use of such an ink can eliminate the previously mentioned troubles even when the ink has been stored for a long period of time after its preparation.

Hereinafter the present invention will be described more specifically b way of Examples. Parts or % in the following refer to parts or % by weight.

EXAMPLES 1A TO 6A (DYE PURIFICATION)

The commercially available dyes listed in Table 1A which appears later were purified according to an ordinary method such as salting-out, fractional precipitation, ultrafiltration, reverse osmosis, ion exchange or the like. Then, these purified dyes were made respectively into a 2% aqueous solution. To each 500 ml of these solutions was added 10 ml of an aqueous solution containing 10 ppm of a flocculant shown in Table 1A, and they were stirred for 2 hrs. Thereafter, the mixture was subjected to pressure filtration or centrifugation to separate flocculates. The filter for pressure filtration was Fluoropore filter (pore diameter of 0.45 $\mu$m) manufactured by Sumitomo Electric Industries, Ltd. and centrifugation was conducted at 12,000 rpm for 30 min. The content (based on powder dye) of inorganic substances in the purified dye was measured with iron picked up as a representative inorganic substance. The results are shown in Table 1A.

EXAMPLE 1A (INK EVALUATION)

Using the purified dye obtained in Example 1A (dye purification), there was prepared an ink for ink jet recording having the following composition.

| Dye | 2 parts |
| --- | --- |
| Diethylene glycol | 40 parts |
| Water | 60 parts |

This ink was subjected to the following T1 to T5 evaluation tests, using a recording equipment having an on-demand type multi-head (discharging orifice diameter: 35$\mu$, resistance of heat-generating resistor: 150 $\Omega$, driving voltage: 30 V, frequency: 2 KHz) wherein the ink stored in the recording head was given a heat energy to generate ink droplets for evaluation of recording. The ink gave good results in all the tests.

(T1) Long term storage stability: The ink was sealed in a plastic film bag and stored for 6 months at $-30°$ C. and $60°$ C., separately. No insoluble appeared and further there was no change in ink properties and color.

(T2) Discharging stability: The ink was subjected to continuous discharging of 24 hours in atmospheres of room temperature, 5° C. and 40° C., separately. Constantly stable and high quality recording could be conducted in all the conditions.

(T3) Discharging response Two cases of intermittent discharging of 2 sec and discharging after 2 month standing were examined. In each case, there was no clogging at the orifice tip and there was obtained stable and uniform recording.

(T4) Quality of recorded image: Using the ink, recording was conducted on the recording media listed in Table 2 which appears later. Each recorded image had high optical density and distinctness. When each image was exposed to an indoor light for 6 months, the reduction of its density was 1% or less.

(T5) Fixing on various recording media: Using the ink, printing was conducted on the recording media of Table 2 which appear later. After 15 sec, the printed portion on each recording medium was rubbed with fingers to see image aberration and spreading. In all the cases, there was neither image aberration nor image spreading, and fixing was excellent.

EXAMPLES 2A TO 6A (INK EVALUATION)

Using the purified dyes obtained in Examples 2A to 6A (dye purification) according to the present invention method, inks were prepared in the same manner as in Example 1A (ink evaluation). Each ink was subjected to the same T1 to T5 evaluation tests as in Example 1A (ink evaluation). All the inks showed the same excellent results as in Example 1A (ink evaluation).

EXAMPLE 7A (INK EVALUATION)

The yellow ink, magenta ink, cyan ink and black ink obtained in Examples 1A, 2A, 3A and 5A (ink evaluation), respectively, were subjected to the same T1 to T5 evaluation tests as in Example 1A (ink evaluation), using a recording equipment having an on-demand type recording head (discharging orifice diameter: 50 $\mu$, driving voltage for piezoelectric vibrator: 60 V, frequency: 4 KHz) wherein each ink was discharged by the piezoelectric vibrator. All the inks showed excellent results.

EXAMPLE 8A (INK EVALUATION)

Using the yellow ink, magenta ink, cyan ink and black ink obtained in Examples 1A, 2A, 4A and 6A (ink evaluation), respectively, and the same ink jet recording equipment as in Example 1A (ink evaluation), a photograph of full color was reproduced. In the recorded image, each color was very clear and color reproduction was good.

EXAMPLE 9A (INK EVALUATION)

Each of the inks of different color prepared in Examples 1A to 6A (ink evaluation) was charged into a felt pen. With the cap removed, each felt pen was left standing for 10 days. Then, recording was made on a paper using these felt pens. There was no ink skipping and the recording was smooth.

COMPARATIVE EXAMPLE A (INK EVALUATION)

Using the dyes of Table 1A before purification with a flocculant and in the same manners as in Examples 1A to 6A (ink evaluation), 6 different inks for comparison were prepared.

These inks were subjected to the same T1 to T5 evaluation tests as in Example 1A (ink evaluation). Each ink formed precipitation of insolubles in one month. In the test (T2), missing of ink discharge was often observed, at which time the driving voltage had to be raised. Upon observation of the surface of the heat-generating head using a microscope, adherence of brown deposits was observed.

In the test (T3), clogging occured at the orifices after standing for 1 month and discharging of ink was unstable.

EXAMPLES 1B TO 6B (DYE PURIFICATION)

The commercially available dyes listed in Table 1B which appears later were purified according to an ordinary method such as salting-out, fractional precipitation, ultrafiltration, reverse osmosis, ion exchange or the like. Then, these purified dyes were respectively made into a 2% aqueous solution. To each 500 ml of these solutions were added 10 ml of an aqueous solution containing 10 ppm of a flocculant shown in Table 1B, and they were stirred for 2 hrs. Thereafter, the mixture was subjected to centrifugation to separate flocculants. The content (based on powery dye) of inorganic substances in the purified dye was measured for iron as a representative inorganic substance. The results are shown in Table 1B.

EXAMPLE 1B (INK EVALUATION)

Using the purified dye shown in Example 1B (dye purification), there was prepared an ink for ink jet recording having the following composition.

| Dye | 2 parts |
|---|---|
| Diethylene glycol | 40 parts |
| Water | 60 parts |

This ink was subjected to the same T1 to T5 evaluation tests as in Example 1A (ink evaluation). The results were excellent similarly to those of Example 1A (ink evaluation). In the tests T4 and T5, the recording mediums of Table 2 were used.

EXAMPLES 2B TO 6B (INK EVALUATION)

Using the purified dyes obtained in Examples 2B to 6B (dye purification) according to the present invention method, inks were prepared in the same manner as in Example 1B (ink evaluation). Each ink was subjected to the same T1 to T5 evaluation tests as in Example 1B (ink evaluation). All the inks showed the same excellent results as in Example 1B (ink evaluation).

EXAMPLE 7B (INK EVALUATION)

The yellow ink, magenta ink, cyan ink and black ink obtained in Examples 1B, 2B, 3B and 5B (ink evaluation), respectively, were subjected to the same T1 to T5 evaluation tests as in Example 1B (ink evaluation), using a recording equipment having an on-demand type recording head (discharging orifice diameter 50 μ, driving voltage for piezoelectric vibrator 60 V, frequency: 4 KHz) wherein each ink was discharged by the piezoelectric vibrator. All the inks showed excellent results.

EXAMPLE 8B (INK EVALUATION)

Using the yellow ink, magenta ink, cyan ink and black ink obtained in Examples 1B, 2B, 4B and 6B (ink evaluation), respectively, and the same ink jet recording equipment as in Example 1B (ink evaluation), a photograph of full color was reproduced. In the recorded image, each color was very clear and color reproduction was good.

EXAMPLE 9B (INK EVALUATION)

Each of the inks of different color prepared in Examples 1B to 6B (ink evaluation) was charged into a felt pen. With the cap removed, each felt pen was left standing for 10 days. Then, recording was made on a paper using these felt pens. There was no ink skipping and the recording was smooth.

COMPARATIVE EXAMPLE B (INK EVALUATION)

Using the dyes of Table 1B before purification with a flocculant and in the same manners as in Examples 1B to 6B (ink evaluation), 6 different inks for comparison were prepared.

These inks were subjected to the same T1 to T5 evaluation tests as in Example 1B (ink evaluation). When stored, each ink showed precipitation of insolubles in one month. In the test (T2), missing of ink discharge was often observed, at which time the driving voltage had to be raised. Upon observation of the surface of the heating head using a microscope, adherence of brown deposits was seen.

In the test (T3), clogging occured at the orifice after standing for 1 month and discharging of ink was unstable.

TABLE 1A

| Example No. (dye purification) | Dye | Flocculant | Post-treatment | Iron content (ppm based on dye) Before purification | After purification |
|---|---|---|---|---|---|
| 1A | Acid Yellow 23 | Ferric chloride | Pressure filtration | 525 | 71 |
| 2A | Acid Red 35 | Ferrous sulfate | Centrifugation | 362 | 68 |
| 3A | Direct Blue 86 | Aluminum sulfate | Centrifugation | 416 | 98 |
| 4A | Direct Blue 199 | Sodium aluminate | Centrifugation | 318 | 110 |
| 5A | Food Black 2 | Ferric sulfate | Pressure filtration | 292 | 61 |
| 6A | Food Black 2 | Aluminum hydroxide | Centrifugation | 292 | 50 |

TABLE 1B

| Example No. (dye purification) | Dye | Flocculant | Centrifugation | Iron analytical value (ppm based on dye) Before purification | After purification |
|---|---|---|---|---|---|
| 1B | Acid Yellow 23 | Ferric chloride | (1) | 525 | 66 |
| 2B | Acid Red 35 | Ferrous sulfate | (2) | 362 | 68 |
| 3B | Direct Blue 86 | Aluminum sulfate | (2) | 416 | 98 |
| 4B | Direct Blue 199 | Sodium aluminate | (1) | 318 | 110 |
| 5B | Food Black 2 | Ferric sulfate | (1) | 292 | 55 |
| 6B | Food Black 2 | Aluminum hydroxide | (2) | 292 | 49 |

TABLE 1B-continued

| Example No. (dye purification) | Dye | Flocculant | Centrifugation | Iron analytical value (ppm based on dye) | |
|---|---|---|---|---|---|
| | | | | Before purification | After purification |
| | 2 | | | | |

(1) Continuous centrifuge (A-251, manufactured by Kokusan Enshinki) 16,000 rpm, 30 min, 20° C.
(2) Centrifuge (18RR-2, manufactured by Hitachi Koki, Co., Ltd.) 15,000 rpm, 45 min, 20° C.

TABLE 2

| Recording medium (brand name) | Classification | Manufacturer |
|---|---|---|
| Ginkan | High quality paper | Sanyo-kokusaku Pulp Co., Ltd. |
| Seven Star | High quality paper | Hokuetsu Paper Mills Co., Ltd. |
| Hakubotan | Intermediate quality paper | Honshu Paper Co., Ltd. |
| Toyo Roshi No. 4 | Non-sized paper | Toyo Roshi K. K. |

We claim:

1. A method for purifying a dye solution, comprising dissolving a dye containing iron or silicon impurities to prepare an aqueous dye solution, adding an inorganic flocculant selected from the group consisting of ions of bi- or higher-valent metals or semi-metals, ions of metal or semi-metal compounds, ions of metal or semi-metal oxides and hydrates of such ions to said dye solutions thereby precipitating said iron or silicon impurity and thereafter removing said precipitated iron or silicon impurity from the solution by at least one of centrifugation or filtration so as to attain a concentration of iron of at most 200 ppm and a concentration of silicon of at most 250 ppm based on said dye.

2. A method according to claim 1, wherein the flocculant is at least one substance selected from the group consisting of aluminum hydroxide, aluminum sulfate, ferrous sulfate, ferric sulfate, ferric chloride and ferric hydroxide, calcium sulfate, calcium carbonate, calcium hydroxide, $Fe_2(SO_4)_3 \cdot FeCl_3$ and sodium aluminate.

3. A method according to claim 1, wherein the dye is a water-soluble dye.

4. A method according to claim 1, wherein the dye is dissolved in the solvent at a concentration ranging from 0.1 to 10% by weight.

5. A method according to claim 1, wherein the flocculant is added in an amount ranging from 0.01 to 1 part by weight based on 100 parts by weight of the dye.

6. A method according to claim 1, wherein the solvent is water.

7. A method according to claim 1, wherein the solvent is a mixed solvent consisting of water and a water-soluble organic solvent.

8. A method for purifying a dye solution, comprising the steps of dissolving a dye containing iron or silicon impurities to prepare an aqueous dye solution, adding an inorganic flocculant selected from the group consisting of ions of bi- or higher-valent metals or semi-metals, ions of metal, or semi-metal compounds, ions of metal or semi-metal oxides and hydrates of such ions to said solution thereby precipitating said iron or silicon impurity, and thereafter removing said precipitated iron or silicon impurity from said solution by at least one of filtration or centrifugation so as to attain a concentration of iron of at most 200 pk ppm and a concentration of silicon of at most 250 ppm based on said dye.

9. A method according to claim 8, wherein the flocculant is at least one substance selected from the group consisting of aluminum hydroxide, aluminum sulfate, ferrous sulfate, ferric sulfate, ferric chloride and ferric hydroxide, calcium sulfate, calcium carbonate, calcium hydroxide, $Fe_2(SO_4)_3 \cdot FeCl_3$ and sodium aluminate.

10. A method according to claim 8, wherein the dye is a water-soluble dye.

11. A method according to claim 8, wherein the dye is dissolved in the solvent at a concentration ranging from 0.1 to 10% by weight.

12. A method according to claim 8, wherein the flocculant is added in an amount ranging from 0.01 to 1 part by weight based on 100 parts by weight of the dye.

13. A method according to claim 8, wherein the solvent is water.

14. A method according to claim 8, wherein the solvent is a mixed solvent consisting of water and a water-soluble organic solvent.

15. A method according to claim 1, wherein said precipitated iron or silicon impurity is removed by centrifugation.

16. A method according to claim 8, wherein said precipitated iron or silicon impurity is removed by centrifugation.

17. A method for producing an ink, comprising the steps of:
(A) dissolving a dye containing iron or silicon impurities in water to prepare a dye solution
(b) adding an inorganic flocculant selected from the group consisting of ions of bi- or higher-valent metals or semi-metals, ions of metal or semi-metal compounds, ions of metal or semi-metal oxides and hydrates of such ions to said solution thereby precipitating the iron or silicon impurity contained in said dye and thereafter removing said precipitated iron or silicon impurity from said solution by at least one of centrifugation or filtration so as to attain a concentration of iron of at most 200 ppm and a concentration of silicon of at most 250 ppm based on said dye, and
(C) mixing the dye solution of step (B) with water or a water-stable organic solvent, in order to prepare said ink.

18. A method according to claim 17 wherein the flocculant is at least one substance selected from aluminum hydroxide, aluminum sulfate, ferrous sulfate, ferric sulfate, ferric chloride, ferric hydroxide, calcium sulfate, calcium carbonate, calcium hydroxide, $Fe_2(SO_4)_3 \cdot FeCl_3$ and sodium aluminate.

19. A method according to claim 17, wherein the dye is a water-soluble dye.

20. A method according to claim 17, wherein the dye is dissolved in water at a concentration ranging from 0.1 to 10% by weight.

21. A method according to claim 17, wherein the flocculant is added in an amount ranging from 0.01 to 1 part by weight based on 100 parts by weight of the dye.

22. A method according to claim 1, wherein the flocculant is at least one of an iron-type and an aluminum-type flocculant.

23. A method according to claim 8, wherein the flocculant is at least one of an iron-type and an aluminum-type flocculant.

24. A method according to claim 17, wherein the flocculant is at least one of an iron-type and an aluminum-type flocculant.

25. A method according to claim 17, wherein said precipitated iron or silicon impurity is removed by centrifugation.

* * * * *

UNITED STATES PATENT AND TRADEMARK OFFICE
CERTIFICATE OF CORRECTION

PATENT NO. : 4,867,789                    Page 1 of 3
DATED     : September 19, 1989
INVENTOR(S) : Eida, et al.

It is certified that error appears in the above-identified patent and that said Letters Patent is hereby corrected as shown below:

[57] ABSTRACT:

Line 4, "imprity" should read --impurity--.

Line 6, "on ink" should read --an ink--

COLUMN 1:

Line 55, "does not" should read --does not clog--.

COLUMN 2:

Line 1, "addition" should read --the addition--.

Line 10, "tor" should read --tors--.

Line 27, "a water" should read --water--.

Line 45, "4" should read --94,--.

COLUMN 3:

Line 3, "as," should read --as--.

Line 15, "encounter" should read --encounters--.

Line 47, "changes" should read --change--.

UNITED STATES PATENT AND TRADEMARK OFFICE
CERTIFICATE OF CORRECTION

PATENT NO. : 4,867,789            Page 2 of 3

DATED : September 19, 1989

INVENTOR(S) : Eida, et al.

It is certified that error appears in the above-identified patent and that said Letters Patent is hereby corrected as shown below:

COLUMN 4:

Line 31, "contain," should read --contains,--.

Line 63, "b" should read --by--.

COLUMN 5:

Line 44, "response" should read --response:--.

Line 57, "appear" should read --appears--.

COLUMN 6:

Line 65, "powery dye)" should read --powdery dye)--.

COLUMN 8:

TABLE 1A

1st column heading, "cation" should read --cation)--.

UNITED STATES PATENT AND TRADEMARK OFFICE
CERTIFICATE OF CORRECTION

PATENT NO. : 4,867,789

DATED : September 19, 1989

INVENTOR(S) : Eida, et al.

It is certified that error appears in the above-identified patent and that said Letters Patent is hereby corrected as shown below:

<u>COLUMN 9</u>:

Line 65, "200 pk ppm" should read --200 ppm--.

<u>COLUMN 10</u>:

Line 39, "solution" should read --solution,--.

Line 40, "(b)" should read --(B)--.

Line 55, "claim 17" should read --claim 17,--.

Signed and Sealed this

Tenth Day of September, 1991

Attest:

HARRY F. MANBECK, JR.

*Attesting Officer*     *Commissioner of Patents and Trademarks*